April 26, 1938.    C. R. DAVISON    2,115,573
CONVEYING MECHANISM
Filed March 30, 1935    2 Sheets-Sheet 2
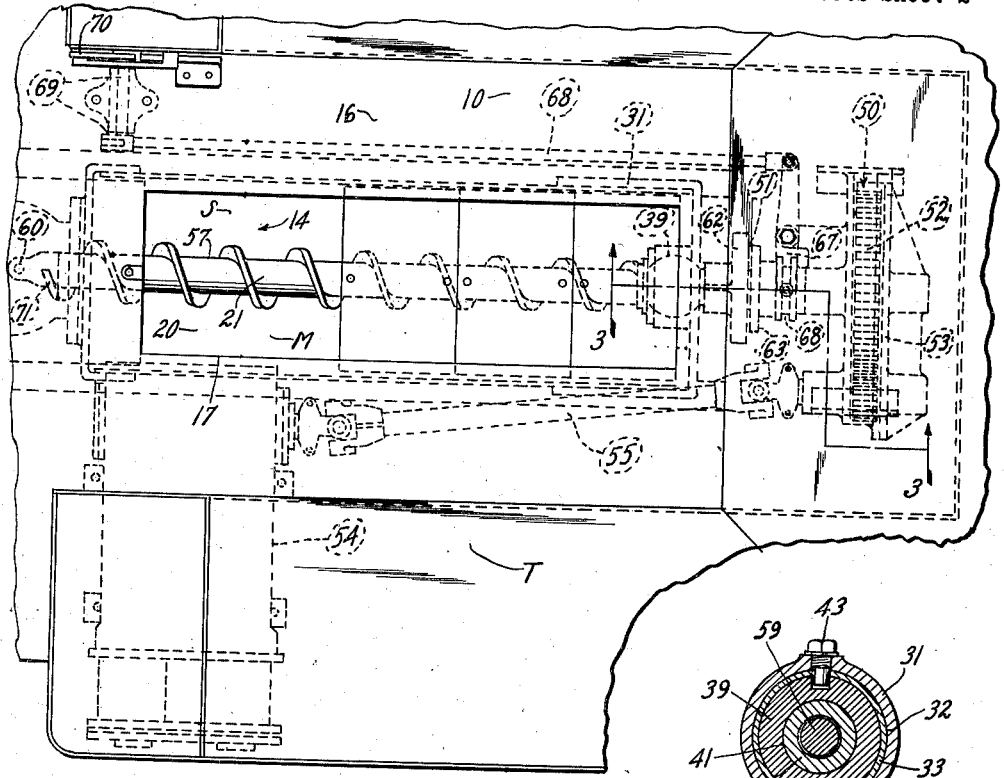
Fig. 2
Fig. 5
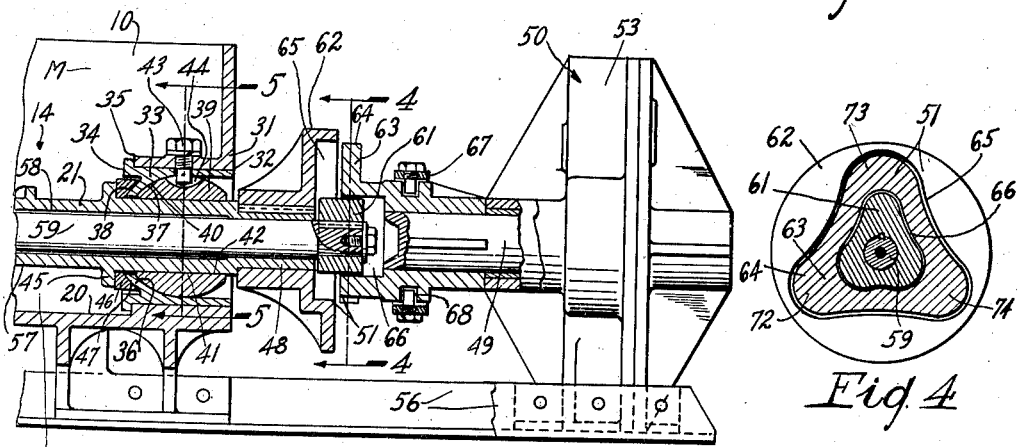
Fig. 3
Fig. 4
INVENTOR
Charles R. Davison
BY
ATTORNEY Patented Apr. 26, 1938

2,115,573

UNITED STATES PATENT OFFICE 2,115,573

CONVEYING MECHANISM

Charles R. Davison, Erie, Pa., assignor, by mesne assignments, to Standard Stoker Company, Inc., New York, N. Y., a corporation of Delaware (1922)

Application March 30, 1935, Serial No. 13,894

6 Claims. (Cl. 198—15)

This invention relates to conveying mechanism and particularly to conveying mechanism of the type employing screw conveyors.

An object of this invention is to improve upon conveying mechanism of the type specified by providing therefor novel means for effecting the drive and efficient operation of said conveying mechanism.

This invention also has for an object the improvement upon conveying mechanism in which a conveyor screw is employed, which improvement consists in mounting the journal for said conveyor screw in a bearing affording angular movement of the conveyor screw.

A further object of my invention is to provide a novel coupling means which serves to operatively connect the conveyor screw mounted as above specified with a drive mechanism.

Another object is to provide a coupling means for the above described construction which is operable to selectively engage or to disengage said coupling means from its operative relation between said conveyor screw and said drive mechanism.

It is also an object of my invention to provide a conveying mechanism employing a conveyor screw the journal of which is mounted in a novel bearing affording angular movement of said journal, a second conveyor screw which is driven by a shaft extending axially of the conveyor screw, and a flexible coupling between a drive mechanism and the conveyor screw and shaft, the flexible coupling being so constructed that it is capable of transmitting power from said mechanism to drive one of said conveyors independently of the other.

Other objects, such as the particular formation of parts and their novel relation one with another, will become apparent as the description of my invention which is illustrated in the following drawings proceeds. On these drawings, which illustrate an embodiment of my invention in connection with a locomotive stoker, Fig. 1 is a central vertical longitudinal section of adjacent portions of a locomotive and tender, showing the invention embodied in a locomotive stoker, parts of which are in similar section and other parts in side elevation;

Fig. 2 is a plan view of the forward portion of the locomotive tender illustrated in Fig. 1, with the stoker conveyor constructed according to this invention in position thereon;

Fig. 3 is an enlarged sectional view taken on the irregular line 3—3 of Fig. 2;

Fig. 4 is a sectional view taken on the line 4—4 of Fig. 3;

Fig. 5 is a sectional view taken on the line 5—5 of Fig. 3; and

Fig. 6 is a view similar to Fig. 3, illustrating another embodiment of my invention.

Figure 1:
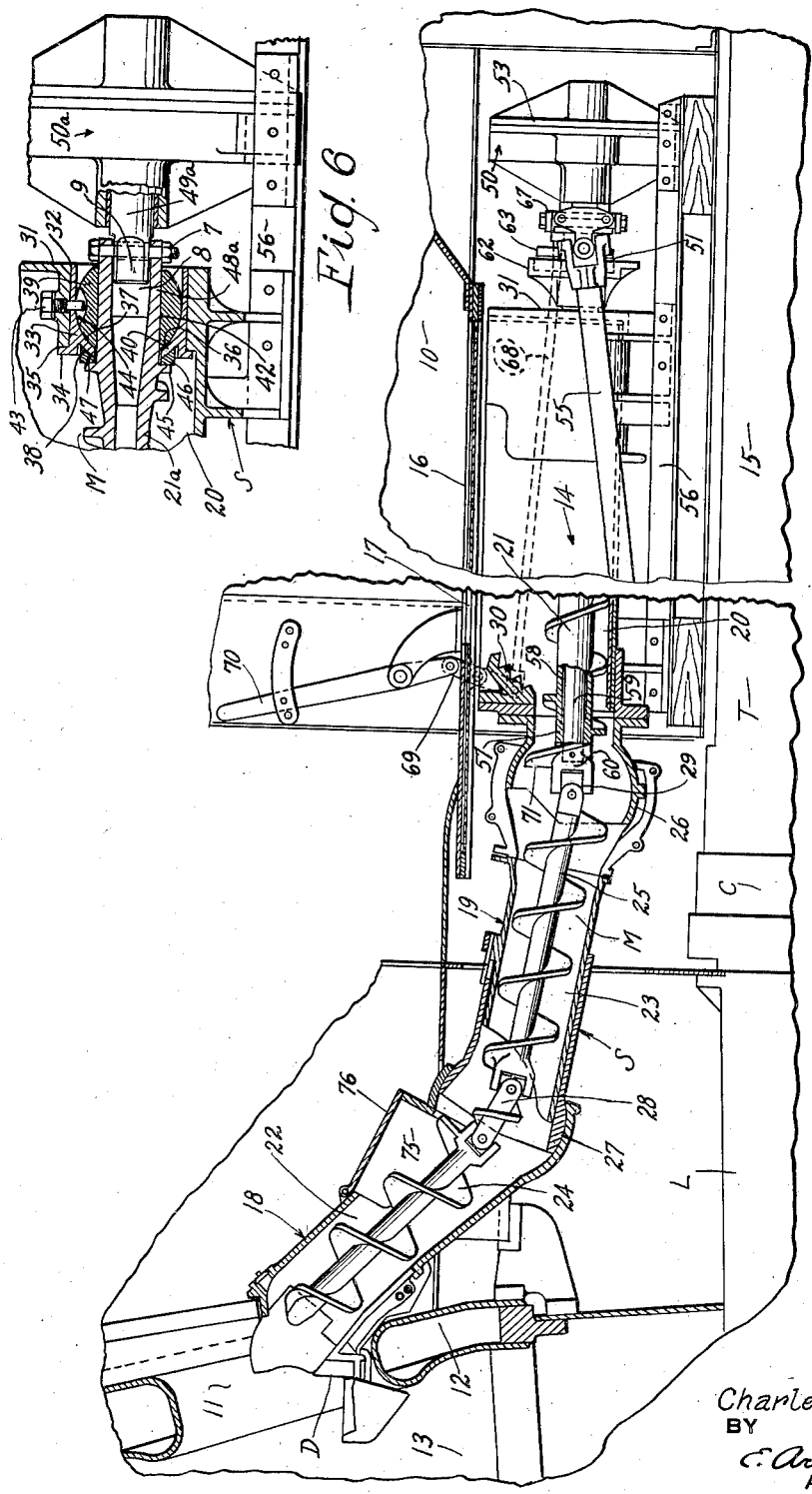

On these drawings, L represents the locomotive, T the tender and C the coupling member therebetween. At S is indicated the stoker which includes the conveying mechanism indicated as a whole at M for urging fuel from the tender fuel bin 10 to a distributor member D which is located at the firing opening 11 of the firebox backwall 12 and serves to project into the firebox 13 the fuel delivered thereto by the conveying system.

In the embodiment of my invention illustrated in Figures 1 to 5, inclusive, the conveying mechanism M includes a plurality of connected conveyors such as the trough conveyor 14 which is rigidly mounted on the under frame 15 beneath the tender floor 16 and receives fuel from the bin 10 through an aperture 17 in the floor 16; the conveying mechanism M further includes an elevating conveyor 18 rigidly carried by the locomotive and an intermediate conveyor 19 disposed between the conveyors 14 and 18. The trough conveyor 14 includes a conduit 20 housing a conveyor screw 21, while the conveyors 18, 19 include conduits 22, 23 each housing a conveyor screw 24, 25, respectively. At its remote ends, the intermediate conduit 23 is universally connected as at 26, 27 to the adjacent ends of the trough and elevating conduits 20 and 22, respectively, affording free movement of the conveyor 19 with respect to the conveyors 14 and 18 when the locomotive and tender are rounding curves, crossing switches or passing over turntables. The conveyor screws 24 and 25 are operatively connected for conjoint rotation by means of a universal joint 28, while at its rearward end, the conveyor screw 25 is driven by a universal joint 29 which is adjacent the forward end of the conveyor screw 21 of the trough conveyor 14.

In conveying material, especially when it is friable, such as coal which is urged through the conveying system of a stoker, it is essential that the passageway for the material be free from bearings as it has been found that bearings for the conveyor screws, when placed within the passageway for material, obstruct the free conveyance thereof and thus cause a break down in the size of the material. Thus, it has been usual to provide but one bearing for the conveyor screw or screws at that end thereof which is not within the passageway for the material. These conveyor screws are usually of considerable length and are mounted within their respective conduits in a manner so as to fit rather freely within the confines of the conduit in order that no binding between the screws and conduit walls may occur; furthermore, as illustrated in the drawings, the several conveyor screws have flexible connections within the passageway, and thus the conveyor screws, during conveyance of the material, will "float" within the conduits. Wear upon the screw flights and the conduit walls aggravates this condition. This is especially true of the conveyor screw 21 which not only conveys the fuel forwardly but also cooperates with a toothed crusher 30 for reducing extremely large lumps of fuel to a size suitable for efficient firing.

Because of the angular movement of the conveyor screw, it is necessary that the rearward or driven end portion of this conveyor screw be mounted in a flexible relation with the bearing therefor or its drive mechanism. I have devised a novel and efficient construction which provides for this flexible relationship of the conveyor screw 21. This construction consists of a housing member 31 preferably formed as an integral part of the trough conduit 20 and provided with a central bore 32 into which is pressed the bushing member 33 having the annular flange 34 in abutting relation with the forward side 35 of the housing member 31. Adjacent the annular flange 34, the bushing member 33 is provided with a spherical lip 36 which extends circumferentially of the central bore 32 forming inner and outer spherical surfaces 37 and 38, respectively.

Within the bushing member 33 is a sleeve 39 having an outer spherical surface 40 in contacting relation with the inner spherical surface 37 of the bushing member 33. The sleeve 39 is also provided with a central bore 41 through which is passed the cylindrical journal 42 of the conveyor screw 21. This journal, as shown, is formed integral with the conveyor screw 21 although it may be formed rigid with the conveyor screw 21 in any other suitable manner. Thus, it will be apparent that the journal 42 rotates within the bore 41 of the sleeve 39 and the entire bearing construction is such that the journal may move angularly or swivelly within the housing member 31 by reason of the coacting spherical surfaces 37 and 40 of the bushing member 33 and sleeve 39, respectively.

Movement of the sleeve 39 about the journal 42 is restrained by means of a pin 43 screwed into the housing member 31 and engaging a slot 44 extending longitudinally of the axis of the sleeve 39. Axial thrusts of the conveyor screw incident to its conveyance and crushing of the fuel are transmitted to the housing member 31 by a thrust collar 45 rigid with the conveyor screw and carrying a washer 46 between one side of the collar and the outer spherical surface 38 of the bushing member 33. This washer is also provided with a spherical surface such as 47 which contacts the outer spherical surface 38 and in this manner axial thrusts of the conveyor screw may be transmitted through the bushing 33 to the housing member 31 while the conveyor screw is disposed angularly with respect to the central bore 32 of the housing member.

The journal 42 has a driven end 48 extending outwardly beyond the conveyor screw bearing and is operatively connected with a driving shaft 49 of the drive mechanism 50 by a flexible coupling 51. Power is transmitted to the driving shaft 49 by gearing 52 which is encased in the housing 53 of the drive mechanism 50, the latter including a motor 54 and shafting 55 operatively connected with the gearing 52. The trough conduit 20 and the gear housing 53 are rigidly mounted upon a rigid base which is in the form of a pair of spaced rails or angle irons 56 whereby the housing 53 and the gears therein are structurally separate from the trough conduit 20 but are carried by the base or rails 56 so that a proper operative relation may be attained between the driving shaft 49 and the driven end 48 of the conveyor screw 21. Since the journal 42 of conveyor screw 21 is mounted in a bearing which affords angular movement of the screw, the reason is evident for the flexible coupling 51 between the driving shaft 49, journalled in the housing 53, and the driven end 48 of the conveyor screw 21.

In locomotive stokers, failures sometimes occur when extraneous material which becomes mixed with the fuel causes a jam or clog in the tender conveyor 14. This will stall the entire conveying mechanism, and for this reason I provide an independent driving connection between the intermediate conveyor screw 25 and the trough screw 21, so that operation of a portion of the stoker conveyor may be continued for delivering fuel to the distributor D by mechanical means.

This independent driving means consists in providing the hub 57 of the trough conveyor screw 21 with a cord hollow 58 extending axially therethrough and housing a shaft 59 which is driven by the shaft 49 of the drive mechanism 50. The driven shaft 59 is arranged to operate within the cored hollow 58 and at its forward end carries a jaw 60, forming one element of the universal joint connection 29. At its opposite end, the driven shaft 59 has keyed thereto a head 61 which always maintains a driving relation with the driving shaft 49, as will presently appear.

For the purpose of operating the intermediate and elevator conveyor screws 25, 24 respectively, independently of the trough conveyor screw 21, the flexible coupling 51 is in the form of a pair of interengageable clutch members, such as the clutch member 62 which is keyed to the driven end 48 of the conveyor screw 21 and the clutch member 63 keyed to the driving shaft 49 and slidable therealong to cause selective engagement or disengagement of its driving head 64 within the recess 65 of the driven clutch member 62. It will be observed from Fig. 3 that the head 61 of the driven shaft 59 is of sufficient length so that it will remain within the recess 66 of the slidable clutch member 63, thereby permitting operation of the screws 24, 25 upon disengagement of the clutch member 63 from the clutch member 62. Movement of the clutch member 63 along the driving shaft 49 is accomplished by means of a pivoted forked member 67 which engages the annular groove 68 of the clutch member 63 and which at its end remote from its forked portion, is operatively connected by a rod 68 having a suitable connection by linkage 69 with the lever 70 at the forward end of the tender and within convenient reach of the fireman.

During normal operation of the stoker conveying mechanism, the conveyor screws 21, 24 and 25 operate as a single articulated conveyor screw, and, in order that a steady and uniform flow of fuel may be attained, the flights of adjacent conveyor screws are positioned as closely together as may be possible consistent with the relative movement between the adjacent conveyors and the universal joint therebetween. Because of this desire to attain the uniform flow of fuel it has been necessary to provide the universal joint jaw 60 with a partial conveyor screw flight 71, which, in the normal operation of the conveyor mechanism, should form a continuation of the flights of the conveyor screw 21.

When only the conveyor screws 24 and 25 are operating, it will be apparent that the jaw 60 with its conveyor screw flight 71 will rotate with the shaft 59, and upon re-engagement of the clutch members 62, 63, there would be no assurance that the partial flight 71 of the jaw 60 would again form a continuation of the conveyor screw 21, which is desirable. I provide a positive means for accomplishing this result by constructing the driving head 64 of the clutch member 63 with a plurality of projections 72, 73 and 74, one of which, such as 73, is not symmetrical in either size, shape or position with respect to the other projections. The recess 65 of the driven clutch member 62 is similarly constructed so that these clutch members 62, 63 can only be re-engaged when the non-symmetrical projection 73 is directly opposite the similarly shaped or positioned portion of the recess 65. It will also be preferable to similarly relate the driving head 61 of the shaft 59 with the recess 66 of the clutch member 63 in order that the parts may be properly assembled.

In the normal operation of the device illustrated in Figures 1 to 5, inclusive, the clutch members 62 and 63 will be in engagement whereby the conveyor screws 21, 25 and 24 will operate as a single conveyor for urging fuel from the tender to the distributor D at the firing opening 11. The hereinbefore described angular or swivel movement of the conveyor screws, and especially such movement of the trough conveyor screw 21 will cause the journal 42 to move angularly within the bearing housing member 31, and since the driven end 48 of the journal is spaced rearwardly of the center of movement of the sleeve 39, there will be a slight angular movement of this portion of the conveyor screw also. In order that no binding action may take place between the clutch members 62, 63 of the coupling 51, the driving head 64 is made slightly smaller than its receiving recess 65 of the driven clutch member 62, as clearly shown in Figures 3 and 4. Similarly, clearance is also provided between the head 61 of the driven shaft 59 and its receiving recess 66 of the clutch member 63. Thus, it will be apparent that the clutch coupling 51 possesses the flexibility necessary during operation of the conveying system.

Whenever a clog occurs in the trough conduit 21, the entire conveying mechanism becomes inoperative. The operator then moves the lever 70 to the position shown in Fig. 1, whereby the clutch members 62 and 63 are disengaged, thereby disconnecting the conveyor screw 21 from its operative relation with the drive mechanism 50, as clearly shown in Fig. 3. The driven shaft 59, however, remains in driving relation with the clutch member 63, and in this manner power will be transmitted to the shaft 59 for operating the screws 24, 25. When these conveyor screws are placed in operation, the fuel within the conduits 22, 23 will be conveyed to the distributor D for projection over the firebed. Additional fuel may be supplied to the operating portion of the conveying system by providing the elevator conduit 22 with a hopper 75 over which is the hinged cover 76. The operator is thus able to supply a charge of fuel manually into the elevator conduit 22, whereby the screw 24 will continue to feed the fuel to the distributor. During this time, the operator may direct his efforts to relieving the clogged condition in the trough conduit 20, and upon so doing, normal stoker operation may be resumed.

In the form of my invention illustrated in Fig. 6, the driven end 48a of the trough conveyor screw 21a is connected to the driving shaft 49a of the drive mechanism 50a by means of a flexible coupling device including the angular portion 9 of the driving shaft 49a which is fitted loosely into the angular core 8 of the conveyor screw 21a. A bolt 7 carried by the conveyor screw 21a passes loosely through the angular portion 9 of the driving shaft 49a to prevent disengagement of the conveyor screw 21a from its operative relation with the driving shaft. The loose fit between the driving shaft 49a and the conveyor screw 21a, and also between the bolt 7 and the driving shaft is sufficient to allow angular movement of the conveyor screw 21a to take place without binding action between the parts.

While it is apparent that the particular construction of the bearing for the conveyor screw journal and also the relation of this journal with the conveyor screw drive mechanism is capable of widespread use, the construction which is specifically illustrated in Fig. 3 is of particular advantage in conveyors employing several conveyor screws, wherein the drive of one is effected by means extending axially through another conveyor screw. It will also be apparent that by mounting the rigid journal of the conveyor screw for axial angular movement within the bearing structure, it is possible to extend the flights of the trough conveyor screw to a point adjacent the journal. Thus, the trough conveyor screw has a longer effective fuel conveying portion than has been heretofore possible to provide in conveyor screws having the same over-all length of prior construction.

I claim:

1. In a conveying system, a conveyor screw having a hollow hub, a shaft in said hollow hub extending axially therethrough and projecting therebeyond, a portion of said shaft projecting beyond said hollow hub being provided with a screw flight, the screw flight on said hub and the screw flight on said shaft normally forming a continuous flight, means associated with said conveyor screw and shaft for selectively engaging them in and disengaging them from operative relation, said means being arranged on re-engaging said conveyor screw and shaft in operative relation to provide a continuous screw flight on said hollow hub and shaft.

2. In a conveying system, a conveyor screw having a hollow hub, a shaft in said hollow hub extending axially therethrough and projecting therebeyond, a portion of said shaft projecting beyond said hollow hub being provided with a screw flight, the adjacent edges of the screw flight on said hub and on said shaft being normally in a predetermined relation, means associated with said conveyor screw and shaft for selectively engaging them in and disengaging them from operative relation, said means being arranged on re-engaging said conveyor screw and shaft in operative relation to place the adjacent edges of the flights on said hub and on said shaft in such predetermined relation.

3. In a conveying system, a conveyor screw having a hollow shaft, a second shaft in said hollow shaft extending axially therethrough and projecting therebeyond, a portion of said second shaft projecting beyond said hollow shaft being provided with a screw flight, the screw flight on said hollow shaft and the screw flight on said second shaft normally forming a continuous flight, a drive shaft in axial alignment with said hollow shaft and said second shaft, a clutch member mounted on said hollow shaft for rotation therewith, a second clutch member slidable longitudinally on the adjacent ends of said second shaft and said drive shaft and mounted for rotation with both, said second clutch member being slidable in one direction for engagement with said first named clutch member and slidable in the opposite direction for disengagement with said first named clutch member, said clutch members being arranged for operative engagement only when said screw flights are in position to form a continuous flight.

4. In a conveying system, the combination including a conduit, a conveyor screw in said conduit, a cylindrical journal rigid with said conveyor screw at the driven end thereof only, a cylindrical housing formed with said conduit, the journal of said conveyor screw extending axially into said housing, a unitary bushing fitted into said cylindrical housing, said bushing having a spherically shaped interior portion and a cylindrical portion, a spherical sleeve loosely fitted over the journal of said conveyor screw and arranged to bear against the spherically shaped interior portion of said bushing, and means including said bushing for transmitting the thrusts of said conveyor screw, incident to its normal operation, to said housing.

5. In a conveying system, the combination including a conduit, a conveyor screw in said conduit, a cylindrical journal rigid with said conveyor screw at the driven end thereof only, a cylindrical housing formed with said conduit, the journal of said conveyor screw extending axially into said housing, a unitary bushing fitted into said cylindrical housing, said bushing having a spherically shaped interior portion and a cylindrical portion, a spherical sleeve loosely fitted over the journal of said conveyor screw and arranged to bear against the spherically shaped interior portion of said bushing, and means including said bushing for transmitting the thrust of said conveyor screw, incident to its normal operation, to said housing and independent of said spherical sleeve.

6. In a conveying system, the combination including a conduit, a conveyor screw in said conduit, a cylindrical journal rigid with said conveyor screw at the driven end thereof only, a cylindrical housing formed with said conduit, the journal of said conveyor screw extending axially into said housing, a unitary bushing fitted into said cylindrical housing, said bushing having a spherically shaped interior portion and a cylindrical portion, a spherical sleeve loosely fitted over the journal of said conveyor screw and arranged to bear against the spherically shaped interior portion of said bushing, means including said bushing for transmitting the thrusts of said conveyor screw, incident to its normal operation, to said housing, and means for operating said conveyor screw from the aforesaid driven end, said last named means including a driving shaft in approximate axial alignment with the driven end of said conveyor screw, and a flexible coupling operatively connecting said driving shaft and the driven end of said conveyor screw.

CHARLES R. DAVISON.